US005367908A

United States Patent [19]

McKenzie

[11] Patent Number: 5,367,908

[45] Date of Patent: Nov. 29, 1994

[54] GAUGE PROTECTION APPARATUS

[76] Inventor: Valance W. McKenzie, 7/140 Braun Street, Deagon, Queensland, 4017, Australia

[21] Appl. No.: 971,902

[22] PCT Filed: Jun. 21, 1991

[86] PCT No.: PCT/AU91/00265

§ 371 Date: Feb. 18, 1993

§ 102(e) Date: Feb. 18, 1993

[87] PCT Pub. No.: WO91/20085

PCT Pub. Date: Dec. 26, 1991

[30] Foreign Application Priority Data

Jun. 21, 1990 [AU] Australia ............................ PK 0757

[51] Int. Cl.$^5$ .............................................. G01D 11/24

[52] U.S. Cl. ....................................... 73/431; 73/865.1

[58] Field of Search ............... 73/416, 431, 325, 865.1

[56] References Cited

U.S. PATENT DOCUMENTS

| | | | |
|---|---|---|---|
| 2,559,480 | 7/1951 | Taegtstroem . | |
| 3,630,089 | 12/1971 | Bissell . | |
| 3,795,148 | 3/1974 | Luich . | |
| 3,807,236 | 4/1974 | Leone . | |
| 4,197,747 | 4/1980 | Koehler | 73/431 |
| 4,466,283 | 8/1984 | Osterhout | 73/865.1 X |
| 4,809,550 | 5/1989 | Faulconer | 73/865.1 X |
| 5,097,705 | 3/1992 | Porter | 73/431 |
| 5,119,677 | 6/1992 | Porter | 73/431 |

FOREIGN PATENT DOCUMENTS

| | | |
|---|---|---|
| 11399/78 | 3/1980 | Australia . |
| 39465/78 | 3/1980 | Australia . |
| 2153799 | 5/1973 | France . |
| 2425701 | 12/1979 | France . |
| 2497996 | 7/1982 | France . |

OTHER PUBLICATIONS

Patent Abstracts of Japan, P-542, p. 147, JP,A, 61-205889 (Citizen Watch Co. Ltd) 12 Sep. 1986 (12.09.86).

Patent Abstracts of Japan, P-99, p. 126, JP,A, 56-138213 & JP,A 56-138214 (Mitsubishi Denki K.K.) Oct. 28, 1981 (28.10.81).

Patent Abstracts of Japan, P-559, p. 29, JP,A, 61-245022 (Nippon Seiki Co Ltd) Oct. 31, 1986 (31.10.86).

*Primary Examiner*—William A. Cuchlinski, Jr.
*Assistant Examiner*—Willie Morris Worth
*Attorney, Agent, or Firm*—Amster, Rothstein & Ebenstein

[57] ABSTRACT

The invention provides gauge protection apparatus (10) for use with a booted gauge set (11). The gauge protection apparatus (10) includes a pair of locating members (16), interconnected by a cross strut (17) and a longitudinal strut (20) to define a cage or pocket within which the boot (12) of the gauge set (11) may be securely located. The locating members (16) are attached to the longitudinal strut (20) at one end (24) by angled nose struts (26), and at an intermediate point (25) by transverse side struts (27). The other end (30) of the longitudinal strut (20) is turned down and terminated by the formation of a loop (31). Passing through the loop (31) and securing the apparatus (10) to the high pressure hose (15) is a disposable electrical tie (32). The tendency of an impact to drive conventional guards through the gauge glass is substantially overcome by the marked clearance between the struts and the glass, with the added significant advantage of protection being afforded without losing significant viewability of the gauges.

10 Claims, 5 Drawing Sheets

GAUGE PROTECTION APPARATUS

This invention relates to gauge protection apparatus.

This invention has particular but not exclusive application to protection apparatus for the protection in use of diving gauges, and for illustrative purposes reference will be made to such application. however, it is to be understood that this invention could be used in other applications, such as any application where a gauge or the like must be protected against physical damage whilst remaining visible for use.

In general, the gauges utilized by divers using self contained underwater breathing apparatus comprise a depth gauge and an air cylinder contents gauge, with or without a compass or the like. Up until recently, such gauges have been of the mechanical analogue type, including a glass face adapted to resist the ambient water pressure whilst permitting viewing of the gauge scale. In recent times, electronic gauge sets have become available, which gauge sets automatically perform the calculations of limits of time and depth, these calculations previously being done manually using tables to interpret the readings of the analogue gauges. Electronic gauges, in common with their mechanical ancestors, generally include a transparent viewing window over the display surfaces of the gauge.

The internal components of most dive gauges are delicate and require protection from shock. To this end, dive gauges are generally grouped into sets by insertion into a rubber or flexible plastic boot. However, since most rubbers are opaque, and since clear silicone rubbers have tended to distort the image of objects observed through it, it has been found desirable to provide apertures in the boot to permit reading of the gauges set therein. The transparent, generally glass or plastic, viewing window or windows of the gauge set are therefore exposed and as such may be damaged by impact. Whilst it would be theoretically possible to replace the glass or other brittle, transparent components with components of a more impact resistant substance such as polycarbonate, acrylic plastic or laminated material, in practice the high compressive strength and resistance to scratching of glass renders glass the preferred material.

The provision of a physical barriers on the glass surface as have been proposed generally suffer from an inherent drawback in that the readability of the gauge is generally impaired to an unacceptable degree. Also, positioning of protective elements on the surface of the glass does not protect the fragile components from impacts which deflect the elements. Raising of the edges of the boot about the viewing apertures also reduces the risk of damage, but in doing so also reduces the readability of the gauges.

The present invention aims to alleviate the above disadvantages and to provide gauge protection apparatus which will be reliable and efficient in use. Other objects and advantages of this invention will hereinafter become apparent.

With the foregoing and other objects in view, this invention in one aspect resides broadly in gauge protection apparatus for protecting the face of a housed gauge, including:

a protecting member;

locating means for operatively positioning said protecting member on the gauge housing whereby said protecting member overlies the gauge face in spaced relationship thereto, and securing means for securing said protecting assembly to the housing of said gauge.

Most dive gauges are manufactured and sold in the form of an assembly of one or more gauges, with or without a dive computer, inserted in a rubber boot. In such applications it is intended that the housing of the gauge refers to the boot mounting the gauges. The following description will hereinafter use the term "housing" with reference to this common type of gauge presentation. However, in older type equipment, the gauge may be without a boot and in such applications the term "housing" may be taken to mean the actual casing of the gauge. Of course, where multiple gauges are housed in a common boot, it is intended that the term "gauge" as used hereinafter also includes multiple gauges.

The protection member may take any form consistent with the function of protecting the face of the gauge whilst permitting free visibility of the gauge, the protection member being spaced from the glass or face of the gauge to provide both ease of readability and to provide added protection to the glass or face of the gauge. For example, the protection member may be selected from bubbles of laminated or high impact glass, bars or grilles of metal such as stainless steel, titanium or aluminium alloy, plastics or other suitable material.

Preferably, the protection member takes the form of a metal bar or grille supported in spaced relationship with the gauge face, with it being particularly preferred to use a grille such that the bar size may be reduced to enhance gauge visibility. The relative merits of using a single bar or a grille will of course be dependent upon the particular gauge to be protected. A further advantage of the use of a grille in the case of typical boot mounted gauges or gauge sets lies in the ability of spaced bars of the grille to resist a wider range of impacts than a single centrally disposed bar, particularly where the gauge may be prone to oblique impact which may avoid the single bar. The use of a grille also enables the distribution of impact loads over more points.

Whilst in most applications one unitary protection member will be preferred, it is also envisaged that more than one protection member may be desirable, for example where a gauge set includes gauges or other components displaying to more than one side of the housing.

The spacing of the protection member from the gauge face may be of any suitable dimension such that the objects of visibility and impact damage resistance are obtained. The spacing will of course depend on the strength and resistance to deflection of the protective member under expected impacts, and the strength of the material used will of course have some bearing on the minimum acceptable dimension of the member to impart the impact resistance. This dimension will in turn determine the minimum acceptable clearance providing suitable readability of the gauge, in the case of opaque materials. In general, it is preferred that the bars of the bar or grille type protective members will be spaced apart from the gauge face by at least the thickness of the bars. If desired, the protective member may be bowed out against the expected impact direction, both for the purpose of providing arch strength and the provide for compactness where the gauge face is itself domed.

The locating means may take any form consistent with the function of locating the protection member in spaced relationship relative to the gauge face. For example, the locating means may be selected from pocket-like or cage-like members adapted to accept the gauge housing whilst leaving the gauge face substantially unobstructed.

Preferably, the locating means and protection member in combination form a protective unit. For example, the protective unit may comprise one or more thin, strong metal struts assembled to or formed integrally with the locating means to form a cage like assembly. The protective unit for the common gauge sets may for example include one or more struts disposed in spaced relationship relative to each other and being spaced from the gauge glass or glasses, the struts preferably being supported in their respective spacings by the aforementioned pocket like or cage like locating means. Where the gauge set is a multiple gauge set, the strut or struts preferably extend longitudinally relative to the generally elongate boot. Alternatively, the protective unit may include the aforementioned struts, in assembly or unitary with locating means adapted to engage the sides of the gauge housing.

The strut or struts may be complemented by transverse struts, either fabricated with or formed integrally with the main struts and the locating means, or in assembly with the locating means alone. For example, the transverse struts may be disposed outwardly from the main strut or struts, the outer ends of the transverse struts being attached to the locating means. Whilst the number and dimension of the transverse struts are preferably minimised to maintain clear visibility of the gauges, it has been found preferable in practice to provide at least one transverse strut, preferably located at approximately the mid point of the main strut, to provide protection against oblique impacts from the side of the gauge.

The securing means of the present invention may take any form consistent with the function of securing the locating means to the gauge housing. Of course, the nature of the securing means will to a large degree be dictated by the form of the gauge housing and the form of the locating means. In addition, it will be realised that the securing means may be part of the locating means, for example, in cases where the locating means is permanently fixed to the boot by integrally moulding the housing about, to or within the locating means. Alternatively, the securing means may take the form of an integral part of the locating means adapted to be removable from or releasable from the housing to permit removal of the gauge from the appartus. Examples of such securing means include lugs adapted to engage corresponding lugs in the boot, and securing portions adapted to be used in conjunction with releasable clips or the like adapted to grip the boot. For example, the locating means comprising a cage like structure as described above may include one or more portions adapted to receive permanent, releasable or disposable securing members such as an electrical tie or the like, the securing member being secured to the housing or the hose adjacent the housing.

Preferably, the apparatus in accordance with the present invention is fabricated from a corrosion resistant material to minimise damage occasioned by the harshly corrosive marine environment. For example, it is envisaged that unitary examples of the present invention may be prepared from high impact plastics material or stainless steel. Alternatively, a titanium example may be fabricated.

In order that this invention may be more easily understood and put into practical effect, reference will now be made to the accompanying drawings which illustrate a preferred embodiment of the invention, wherein;-

Figure 1:
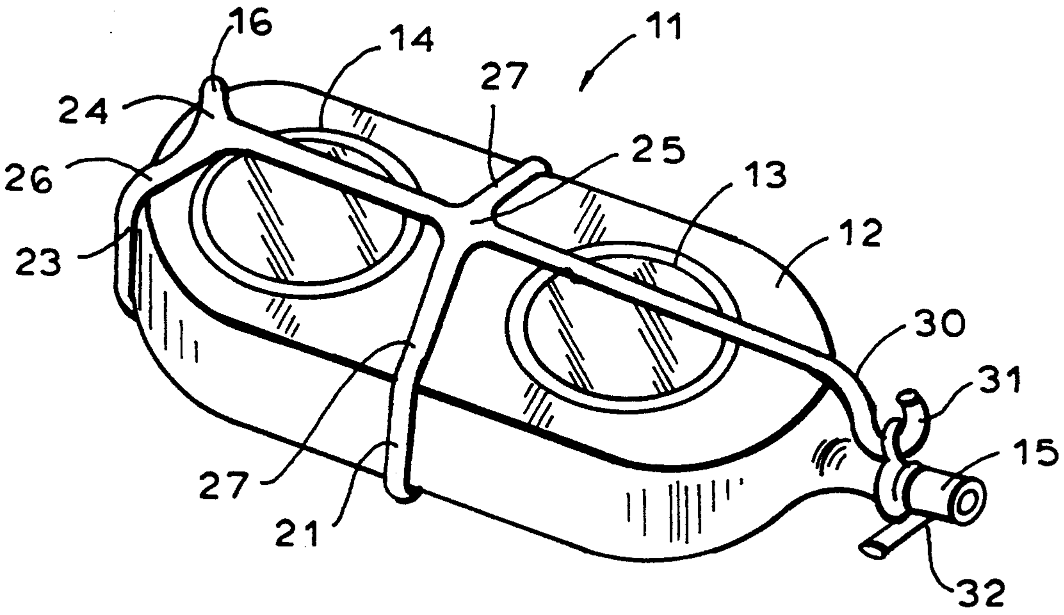
FIG. 1 is a perspective view of gauge protective apparatus in accordance with the present invention.
Figure 2:
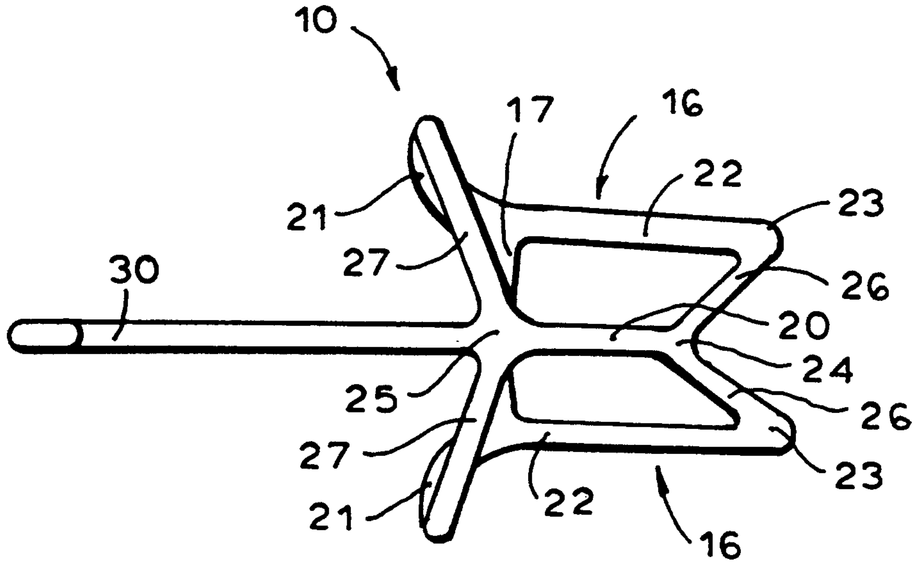
FIG. 2 is a top plan view of the apparatus of FIG. 1.

In the FIGS. 1 and 2 there is illustrated gauge protective apparatus 10 suitable for use in conjunction with a conventional booted two-gauge set 11. The gauge set 11 includes a rubber boot 12 having mounted in recesses therein a contents gauge 13 and a depth gauge 14. The contents gauge 13 is connected to the diving cylinder (not shown) by a high pressure hose 15 which passes through an aperture provided for it in the boot 12.

The gauge protection apparatus 10 includes a pair of opposed cage portions 16, interconnected by a cross strut 17 and a longitudinal strut 20 to define a cage or pocket within which the boot 12 of the gauge set 11 may be securely located. The cage members 16 each comprise a side portion 21, a longitudinal rail 22 and an end portion 23, and each are attached to the longitudinal strut 20 at 24 and 25 by angled nose struts 26 and transverse side struts 27.

The longitudinal strut 20 extends rearward of the side struts 27 until the longitudinal strut 20 clears the rear end of the boot 12. The end of the longitudinal strut 20 is then turned down at 30 and terminated by the formation of a loop 31. Passing through the loop 31 and securing the apparatus 10 to the high pressure hose 15 is a disposable electrical tie 32.

In use, the gauge set 11 is inserted into the pocket of the protection apparatus 10 and a new electrical tie 32 is installed, securing the loop 31 to the high pressure hose 15. Should the gauge set require removal from the apparatus, the tie is simply cut and the gauge set is removable from the pocket of the apparatus.

The abovedescribed embodiment of the present invention provides protection for the glass gauges against impact damage by virtue of the presence of the longitudinal strut 20 and the side and nose struts. Moreover, the tendency of an impact to drive conventional guards through the glass is minimized by the marked clearance between the struts and the glass. However the significant advantage of the apparatus described over the prior art is the fact that the abovedescribed protection is afforded without the loss of a significant degree of viewability of the gauges.

Figure 3:
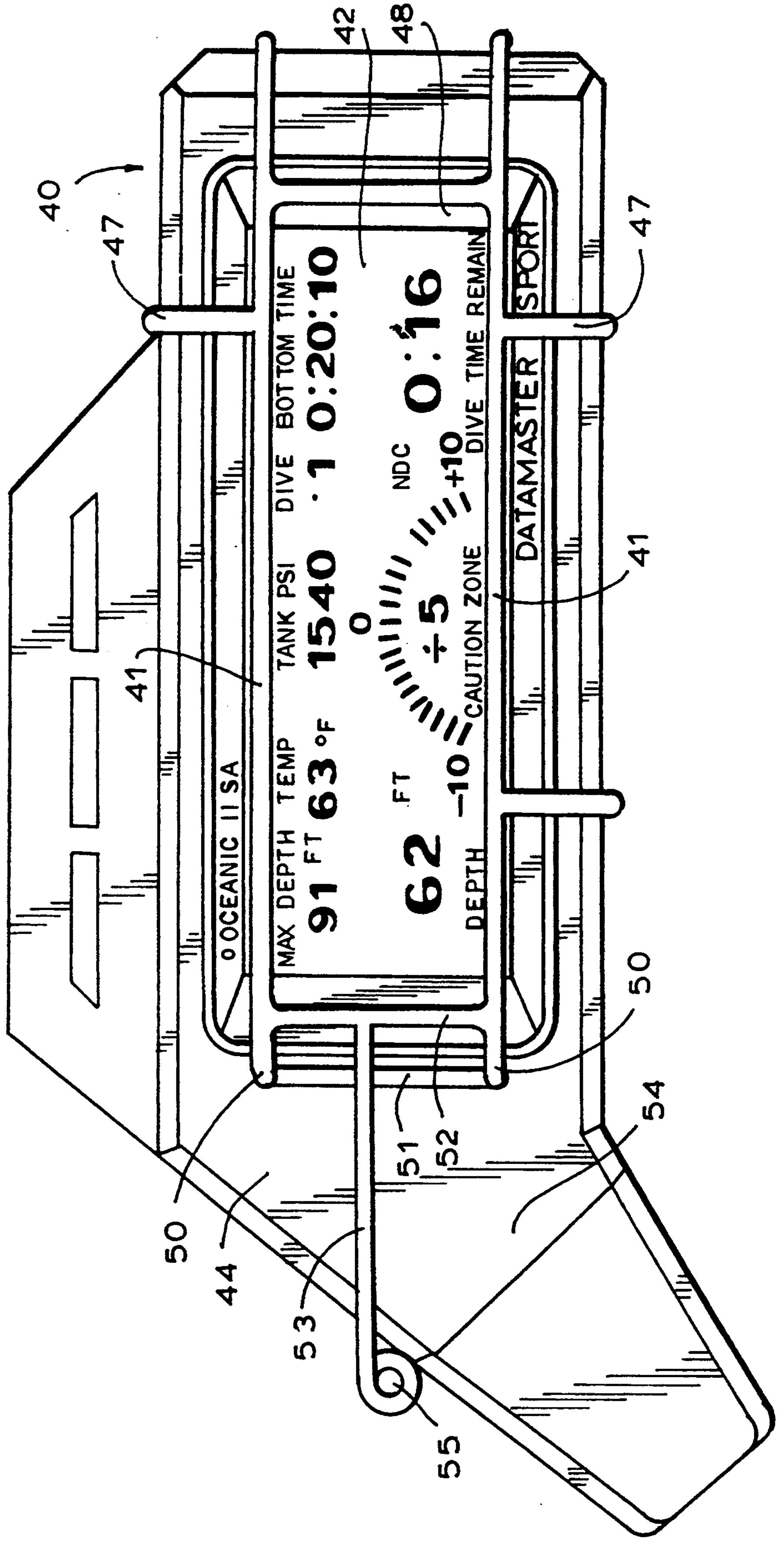
FIG. 3 is a plan view of a dive computer having apparatus installed in accordance with the present invention.
Figure 4:
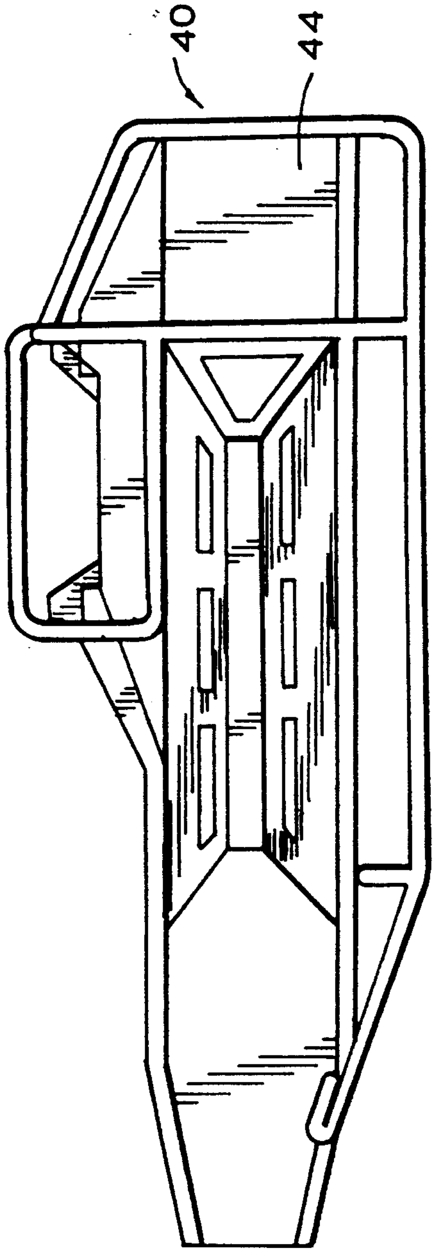
FIGS. 4 and 5 are a side view and bottom plan view of the apparatus of FIG. 3 respectively.
Figure 5:
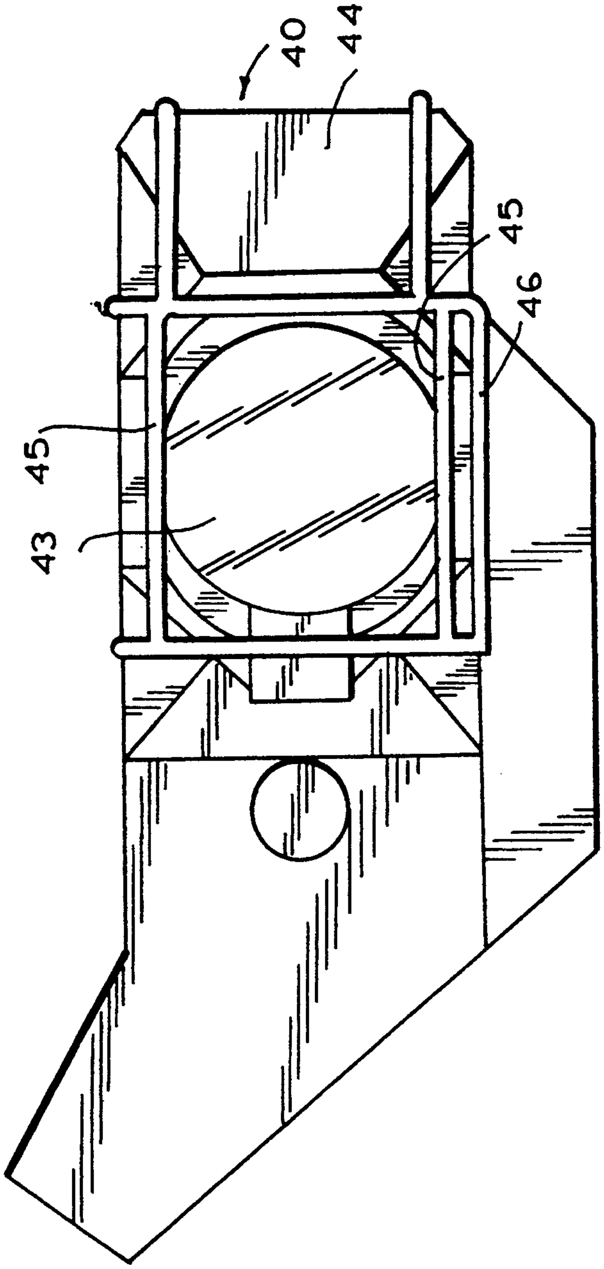

In the alternative embodiment of FIGS. 3 to 5, there is illustrated gauge protection apparatus 40 including a pair of parallel protection members 41 adapted in spacing to effectively protect the elongate viewing screen of a dive computer 42. The particular dive computer 42 is fitted with a compass 43 on the back of the housing 44 of the dive computer 42 and the gauge protection apparatus 40 is provided with a second set of parallel protective members 45 of spacing and clearance to effectively protect the face of the compass 43.

In order to protect the rather exposed elevated compass 43 there is provided a side bar 46 adapted to resist lateral penetration likely to impact on that side of the compass 43.

The parallel protective members 41 extend around the outer end of the dive computer 42 to form the toe of a cage-like pocket adapted to receive the housing 44 of the dive computer 42. The cage is completed by the provision of transverse struts arising from each parallel protective member 41 and adapted to wrap transversely about the housing 44 and welded across the outer ends of the parallel protective members 41 and the second set of parallel protective members 45. The inner end of the second set of parallel protective members 45 and side bars 46 are integral with a transverse bar 48 which wraps around the lower edge of the housing 44 to join the parallel protective member 41.

Turn-down portions of the inner ends of the parallel protective members 41 at 50 provide the proper spacing between the parallel protective members 41 and the face of the dive computer 42, the turn-down ends being terminated by bearer-bar 51. A transverse rib 52 provides rigidity to the inner end of the parallel protective members 41 and also provides a point for attachment of integral extension bar 53. The extension bar 53 extends to a narrowed portion 54 of the housing 44 and terminates in a loop 55 adapted to receive a cable tie or the like (not shown) for securing the apparatus to the housing 44.

Figure 6:
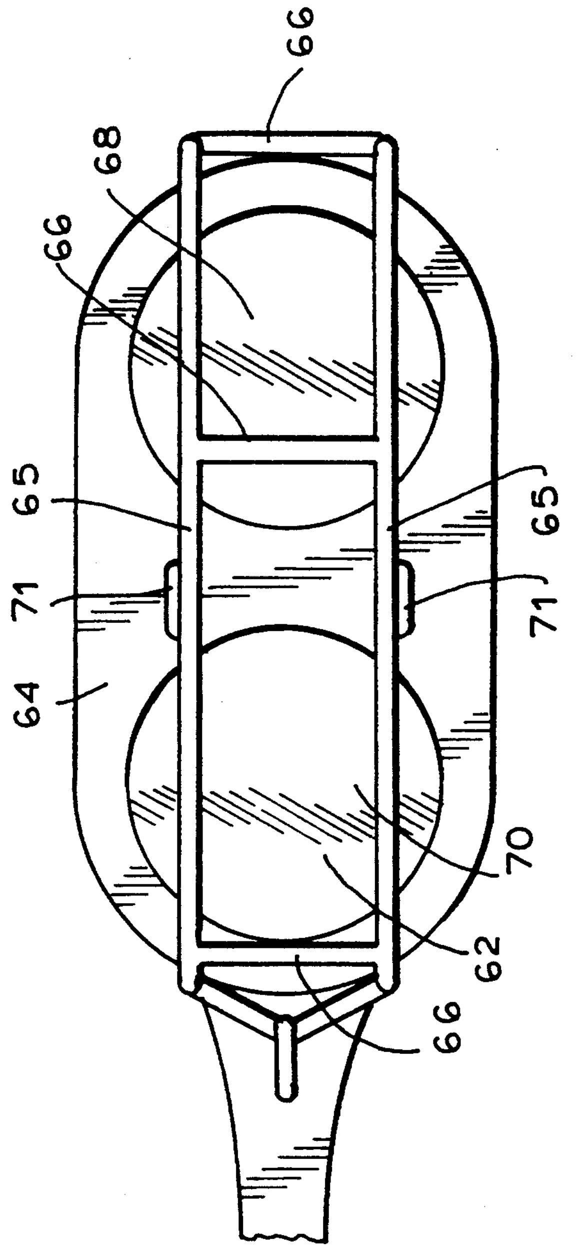
FIG. 6 is a plan view of a yet further alternative embodiment of apparatus in accordance with the present invention.
Figure 6:
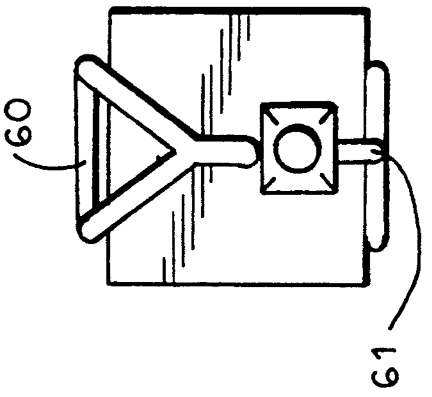
Figure 7:
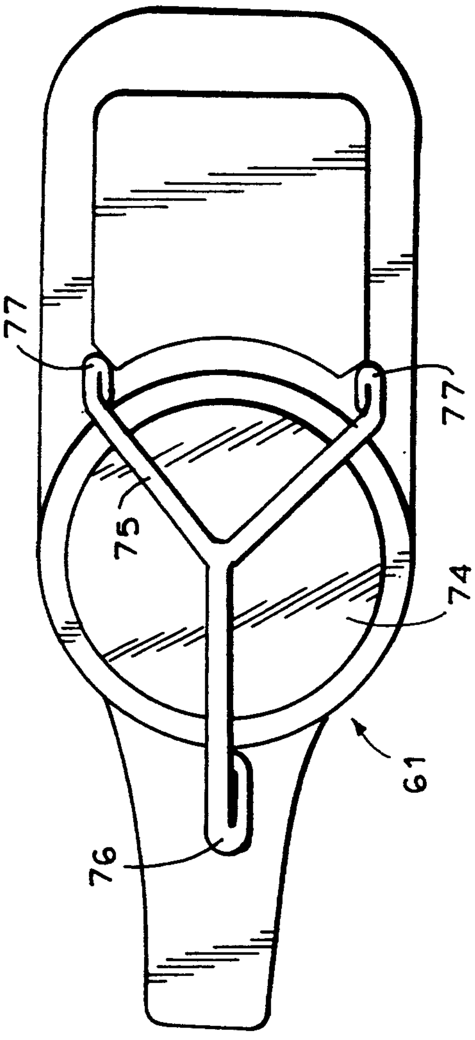
FIGS. 7 and 8 are bottom plan and side views of the apparatus of FIG. 6.
Figure 8:
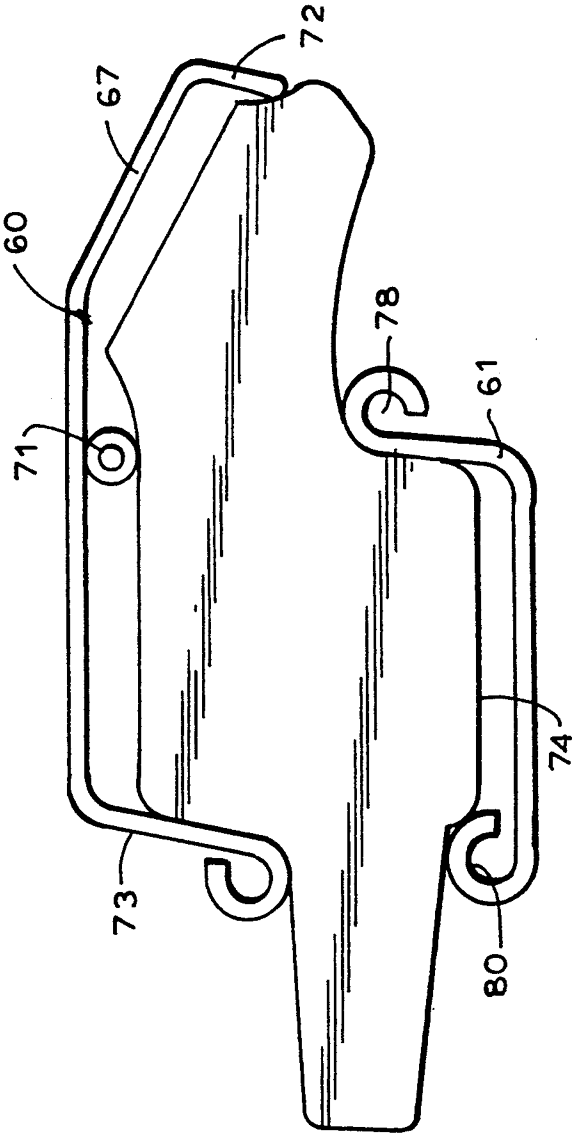

In the embodiment illustrated in FIGS. 6 to 8 there is provided a pair of protective apparatus 60, 61 adapted to protect respective faces 62, 68 of a gauge set 64. The protective apparatus 60 includes a pair of parallel protective portions 65 spaced apart by cross-bars 66, the parallel protective portions 65 being turned down at 67 to provide protection for inclined second gauge face 68.

Between second gauge face 68 and first gauge face 70 are provided a pair of spacers 71 provided integrally with each of the parallel protective portions 65 and providing correct spacing of the parallel protective portions from the first gauge face 70.

Similarly, turn down portion 72 at the outer end of the parallel protective portions 65 maintain proper spacing of the portions 67 from the second gauge face 68. Turn down portion 73 of each of the parallel protective portions 65 at the inner end thereof support the inner ends of the parallel protective portions in a like manner.

The third gauge face 74 of the gauge set is protected by the second of the protective apparatus 61 which comprises a substantially Y shaped protective portion 75 spaced apart from the third gauge face 74 by inner turn down portion 76 and the pair of outer turn down portions 77.

The spacers 71 are apertured and may be secured by means of a cable tie or the like to apertures 78 provided on the ends of the pair of turn down portions 77. Similarly, the inner turn down portions of both the first and second protective members are provided with apertures 80 such that they may be similarly secured with a cable tie or the like.

It will of course be realised that while the above has been given by way of illustrative example of this invention, all such and other modifications and variations thereto as would be apparent to persons skilled in the art are deemed to fall within the broad scope and ambit of this invention as defined in the appended claims.

I claims:

1. Gauge protection apparatus for protecting a gauge assembly of the type including at least one gauge module retained in a resilient housing and having a frangible gauge face, said gauge protection apparatus comprising:

(A) a gauge face protecting member for placement in spaced relation to the gauge face; and (B) supporting means mountable on the resilient housing and located apart from the gauge module for mounting said gauge face protecting member in spaced relationship overlying the gauge face;

said gauge face protecting member and said supporting means in assembly comprising a cage formed to accept the resilient housing within.

2. Gauge protection apparatus according to claim 1, wherein said gauge face protecting member comprises one or more bars.

3. Gauge protection apparatus according to claim 1, wherein said gauge assembly includes gauge modules displaying a gauge face to more than one side of said housing, and wherein a gauge face protecting member is provided for each said housing side.

4. Gauge protection apparatus according to claim 1, wherein said gauge face protecting member has a given thickness and the spaced relationship of said gauge face protection member relative to the gauge face is at least equal to said given thickness of said gauge face protecting member.

5. Gauge protection apparatus according to claim 1, wherein said gauge face protecting member is bowed out against an expected impact direction.

6. Gauge protection apparatus according to claim 1, wherein said gauge face protecting member comprises at least one thin, strong metal main strut secured to said supporting means to form said cage.

7. Gauge protection apparatus according to claim 6, wherein there is provided at least one auxiliary strut located at approximately the midpoint of said main strut and transverse thereto, to provide protection for the gauge face from impacts from directions lateral of said main strut.

8. In combination, gauge protection apparatus according to claim 1 and a gauge assembly, wherein said gauge assembly comprises a diver's gauge assembly including a flexible attachment member connecting said assembly to a diver or diver's equipment, and wherein said supporting means includes a securing portion extending to said flexible attachment member and being securable thereto by a securing member.

9. The combination according to claim 8, wherein said flexible attachment member comprises a high pressure hose connecting self-contained underwater breathing apparatus to a contents gauge within said gauge assembly, and wherein said securing member includes a formed eye securable to said hose by a cable tie.

10. A diver's combination gauge assembly comprising:

(A) a resilient housing;

(B) a contents gauge module, including a gauge face, retained in said housing and suspended from self-contained breathing apparatus by a high pressure hose connected to said contents gauge module;

(C) a gauge face protecting member disposed in spaced relation to said gauge face, and (D) means for supporting said gauge face protecting member engaging said housing away from said contents gauge module;

said gauge face protecting member and said supporting means in assembly comprising a cage formed to accept the resilient housing within.

* * * * *